Oct. 7, 1941.　　　　J. L. BALDWIN　　　　2,258,531
AMUSEMENT DEVICE FOR SMALL CHILDREN
Filed March 20, 1941　　　　2 Sheets-Sheet 1

Inventor
Janice L. Baldwin
By Dyre & Kirchner
Attorn.

Oct. 7, 1941. J. L. BALDWIN 2,258,531
AMUSEMENT DEVICE FOR SMALL CHILDREN
Filed March 20, 1941 2 Sheets-Sheet 2
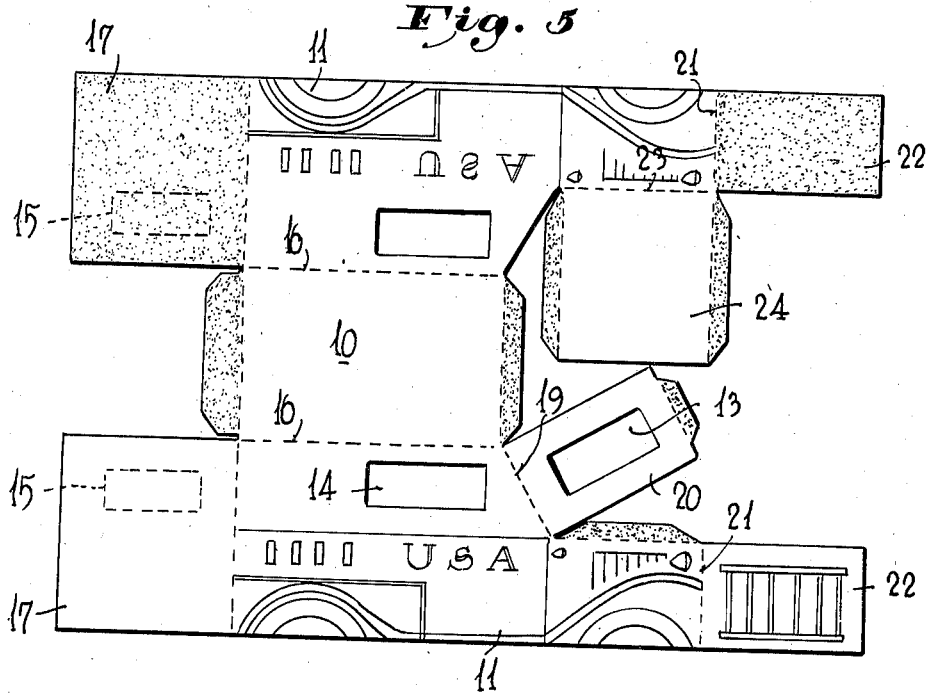
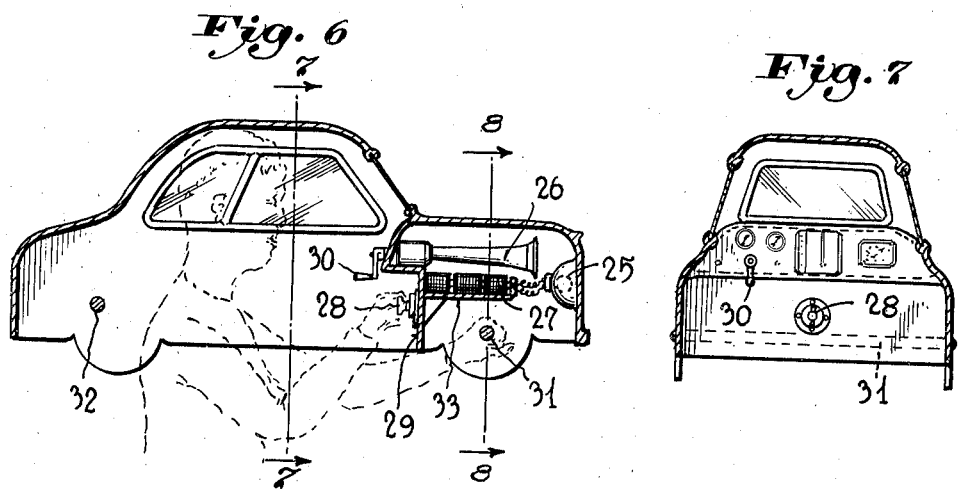
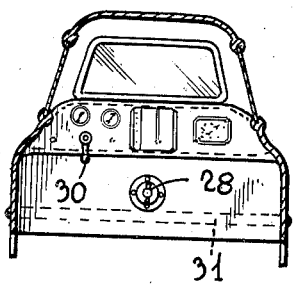
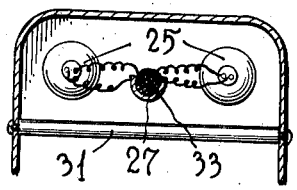
Inventor
Janice L. Baldwin
By Dyke & Kirchner
Attorneys Patented Oct. 7, 1941

2,258,531

UNITED STATES PATENT OFFICE 2,258,531

AMUSEMENT DEVICE FOR SMALL CHILDREN

Janice L. Baldwin, Warrenton, Va.

Application March 20, 1941, Serial No. 384,404

8 Claims. (Cl. 46—1)

My invention relates to amusement devices and more particularly provides an article comprising a toy structure which small children can safely use in entertaining themselves.

More specifically, the subject of the invention is a box-like hollow structure made in simulation of the outward appearance of any of numerous kinds of vehicle bodies, e. g., automobile bodies, that can be held by a small child in enclosing relation with his head to give the child the illusion that he is in the vehicle or to enable him to pretend that he is the vehicle.

I am of course aware of the fact that it is common to provide costumes for theatrical and masquerade use that simulate the appearance of animals and other non-human forms, but none of these with which I am familiar has any usefulness in the field of small child self-entertainment. Attempts to employ such costumes for this purpose have been unsuccessful, apparently because the elaborateness of a complete body covering, the difficulty of donning and doffing it, the inability of the child to see out of it except through small forward openings in the straight-ahead line of his vision, and the oppressive sense of being closely confined all combine to frighten the small child. Those familiar with the handling of pre-school age children will readily appreciate how difficult it frequently is to have them willingly do themselves, to entertain themselves, what they find entertaining when done by adults for them. The device provided by the present invention is devoid of all these objections of the complete body coverings of the prior art devices which are intended for adult use and is distinguishable thereby from such prior art.

Briefly and generally speaking, the new device is characterized by an opening in its bottom plane which is considerably larger than would be required to admit the child's head to the hollow interior. The sides of the structure depend not substantially lower than the neck or shoulder level when the child's head is in contact or nearly in contact with the inner surface of the top wall or roof. The child is therefore not oppressed by any sense of close or complete confinement from which it would be difficult to free himself, since he has always most of his body outside the device, his hands and legs are free, and he can completely remove the device instantly by the simple expedient of lifting it from his head. In the preferred forms of embodiment the structure is provided with side openings as well as a front opening, and in all cases the interior is large enough to permit the child to turn his head inside the enclosure, so that these characteristics combine and cooperate to impress the child with the feeling that he is practically as unconfined as if he were not wearing the device while at the same time he feels that he presents the appearance of a person in a vehicle or the appearance of a vehicle itself.

To enhance the child's illusion that he is the operator of or a passenger in such a vehicle as the device simulates, I prefer in certain embodiments of the invention to depict on a portion of the interior of the structure some furnishings or instrumentalities characteristic of the particular vehicle. Thus, in those embodiments that represent motor vehicles I prefer to provide a simulation of an instrument board in such position that the child can see it while he is using the device, and on this instrument board I may provide representations of conventional automobile instrument board devices.

In its simplest form the device can be made at exceedingly low cost, as for example out of a cardboard blank, or a set of blanks, appropriately printed to present the desired appearance. In more pretentious forms the device can be made of preformed shape, out of papier mâché, plastic or the like, and may be provided with accessories characteristic of the vehicle which is intended to be simulated, such as headlights and a warning signal horn in the case of an automobile, a gun in the case of a military tank, a smokestack in the case of a steamship or locomotive, etc. Handholds by which the child may grasp the structure to steady it in position may be provided, or the child may be left to hold it by a bottom edge of one of the walls. A stiffening framework or member may be included, or the inherent rigidity of such material as may be selected for the walls may be deemed sufficient so that the expense of stiffening adjuncts may be avoided. It will be evident that embodiments of the invention may be made throughout a wide cost range to cater to purchasers in various price fields including the very lowest.

Certain illustrative embodiments of the invention have been selected to exemplify its application. These are shown in the accompanying drawings, in which:

Fig. 5 is a plan view of a type of blank which may be formed of some inexpensive sheet material such as relatively heavy cardboard for providing the structure shown in Fig. 3. The blank is depicted on a relatively enlarged scale;

Fig. 6 is a longitudinal vertical section of a further modification, showing the invention embodied in pre-formed material, such as plastic, papier mâché or the like;

Fig. 7 is a cross sectional view taken on the line 7—7 of Fig. 6; and

Fig. 8 is a similar section taken on the line 8—8 of Fig. 6.

It is to be understood that these illustrative embodiments are selected for the purpose of exemplification and not limitation and are made in conformity with section 4888 of the Revised Statutes.

Figure 1:
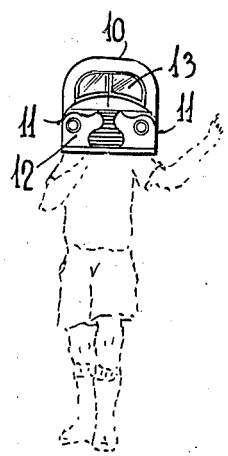
Figure 1 is a front elevational view, on a relatively reduced scale, showing one embodiment of the invention in use.
Figure 2:
Fig. 2 is a side elevational view of the embodiment shown in Fig. 1.

Figs. 1–4 show the appearance in use of several exceedingly inexpensive embodiments of the invention. Figs. 1 and 2 illustrate the device embodied in the form of an automobile body of the sedan type; the Fig. 3 structure simulates the body of an armored motor car; and Fig. 4 simulates a military tank. All of these structures, and of course numerous other types, may be made of folded sheet material such as relatively heavy cardboard.

Figure 3:
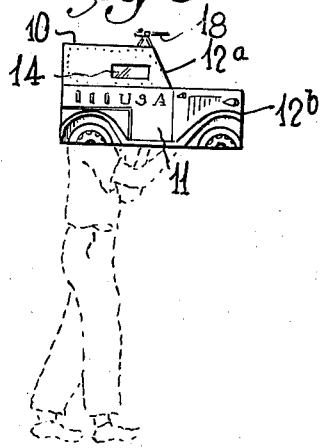
Figs. 3 and 4 are side elevational views of slightly modified embodiments.
Figure 4:
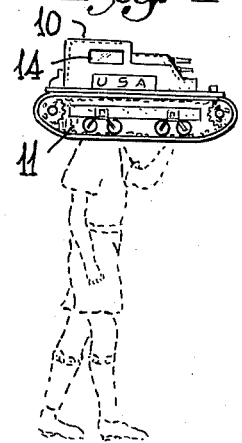

In each of these cases the structure comprises a top wall or roof 10, a pair of side walls 11 and a pair of end walls of which the front end wall is shown at 12 in Fig. 1. In most types of vehicle the front end wall is made in two or more steps so as to include a windshield portion 12a and a radiator portion 12b, as best shown in Fig. 3.

The bottom plane of the structure is best left entirely open to provide a large and unobstructed access to the hollow interior. The bottom opening is therefore defined by the lower edges of the side and end walls. The several walls are so proportioned that their lower edges will lie in a more or less common plane extending to about the shoulder level of the child when his head is positioned in the hollow interior of the device and the roof or top wall is at or about the level of the top of the child's head.

In comparison with the proportions of the actual vehicle bodies which the devices are intended to simulate, the structures are best foreshortened somewhat, or may be abnormally wide in proportion to their length. In this way the structures are made somewhat more nearly square in plan than are the actual vehicle bodies which they simulate. This is done principally to make it easier for the small child to steady the device in enclosed relation with his head, face and neck.

In the position in which the device is used the lower edges of the side and end walls may rest on the child's shoulders or they may be positioned somewhat above or below the shoulder level. The device can be steadied in this position by one of the child's hands which may hold some more or less forward part of the device as is illustrated in Figs. 1–4.

The front wall of the structure, and more particularly the upper or windshield portion 12a of the front wall is provided as a sizable opening 13 that will be positioned at the eye level of the child when he holds the structure in enclosed relation with his head. Openings 14 are provided also at this same level in the side walls, and an additional opening 15 (Fig. 5) may also be provided if desired in the rear wall. It results that the child using the device has unobstructed vision to the front as well as to both sides and to the rear also if the optional opening 15 be provided. Inasmuch as the child is able to turn his head freely within the device, and to see out of it forwardly, to either side, and perhaps also to the rear, he experiences no oppressive feeling of confinement. I have found that this feature makes the device acceptable to very young children who would be unwilling to permit their heads to be enclosed by any structure providing less opportunity for vision. The fact that the device can be instantly removed by the child from his head by the simple expedient of lifting it a few inches also materially contributes to the feeling of confidence with which the small child will use the device.

The several walls of the device are appropriately ornamented, as by printing, lithographing or the like, to simulate the appearance of some sort of vehicle. If desired, some accessories, like the gun 18 of Fig. 3, may be added to the device after it is disposed in make-up form.

The type of embodiment illustrated in Figs. 1–4 may be formed from a single blank of cardboard or the like, or it may be made up from several blanks having appropriate provisions for assembling. Such provisions may take the form of cooperating tabs and slits, adhesively coated areas, or even wooden strips or lugs attached to one element of the blank and adapted to receive a tack inserted through a cooperating element.

In Fig. 5 I show a type of unitary blank from which the armored car of Fig. 3 may be formed. In Fig. 5 the portion 10 constitutes the roof or top wall when the blank is folded along the lines 16 so that the portions 11 become the side walls. The rear wall may be formed in double thickness at the portions 17 which may optionally be provided with a rear opening 15. By folding along the oblique line 19 the angularly extending portion 20 becomes the windshield or upper portion of the front wall of the blank, and by folding along the lines 21 the portions 22 provide in double thickness the radiator or lower part of the front wall. Folding along the line 23 disposes the portion 24 between the two side walls to serve as the hood cover of the simulated vehicle. The two side walls are provided with openings 14 and the upper portion of the front wall has the opening 13.

In Fig. 5 various tabs are provided on the several portions and each is coated with glue or the like as indicated by the stippling in the figure to attach the tab to the cooperating juxtaposed portion of the blank when folded and made up. In the same way one of the edge portions 17 and 22 is adhesively coated to secure it to the cooperating portion.

It will be understood that the unitary blank of Fig. 5 is representative of other and appropriately modified forms of blank which may be used to produce the other vehicle types within the spirit of the invention. The armored car of Fig. 3, being devoid of curved lines and surfaces, lends itself particularly to formation from a unitary blank. Those embodiments of the invention which include curvatures can best be made from a plurality of blanks provided with connecting means as suggested hereinabove.

Figs. 6, 7 and 8 show a somewhat more elaborate embodiment of the invention, which is best made of pre-formed material. In such embodiment the simulation of a motor car body may be enhanced by providing the structure with such accessories as a pair of headlights 25 and a warning signal horn 26. The space within the hood provides ample room for these elements as well as for a flashlight battery 27 in circuit with the headlights and a switch 28 mounted on a dash partition 29 conveniently accessible to the child's hand. The horn may also be mounted on the partition 29 and it may have actuating means 30 positioned in the region of the switch 28. A cross tie rod 31 may connect the two side walls in the lower part of the hood to stiffen the structure and serve as a handhold by which the child may steady the device in position. If deemed necessary a corresponding tie rod 32 may be used to stiffen the rear part of the body. The battery 27 may be supported on a shelf 33 connected to the dash partition or to the two hood side walls. It will be obvious that the opportunity for the child to switch headlights on and off and to sound the horn adds considerably to his enjoyment.

The term "vehicle" as used throughout this specification and the claims is intended to include within its comprehension all types of conveyances designed to move by land, water or air. Typical examples of the kind of vehicles in which my invention may be embodied are automobiles, railway rolling stock, airplanes and balloons, ships and boats. It is deemed to be obvious that the choice of the particular vehicle to be simulated is a matter for selection.

The hereinabove described and other valuable features of the invention are defined in various combinations by the appended claims, which are intended to cover not only the illustrated embodiments but also all modifications within the spirit of the invention.

I claim:

1. A child's amusement device comprising a hollow box-like structure having a roof and side and end walls simulating the outward appearance of a motor vehicle body, said structure having a hollow interior large enough to enclose and contain the child's head and neck with freedom to move therein when the lower edges of the structure are positioned at about shoulder level, the front end wall and the two side walls having openings simulating the side window and windshield panes of the simulated motor vehicle body, and the side walls being so proportioned that their lower edges may be grasped by the child's hands and held at substantially shoulder level to position said openings at about eye level.

2. A child's amusement device comprising a hollow box-like structure having a roof and side and end walls simulating the outward appearance of a motor vehicle body, said structure having a hollow interior large enough to enclose and contain the child's head and neck with freedom to move therein when the lower edges of the structure are positioned at about shoulder level, the front end wall and the two side walls having openings simulating the side window and windshield panes of the simulated motor vehicle body, and a cross tie rod connecting the forward portions of the side walls to stiffen the structure and constitute means by which the structure may be held by the child's hand and steadied in head-enclosing position, the front end and side walls being so proportioned that said openings will be at about eye level when the structure is so positioned about the head that its lower edges are at substantially shoulder level.

3. A child's amusement device comprising a hollow box-like structure having a roof and side and end walls simulating the outward appearance of a motor vehicle body, said structure having a hollow interior large enough to enclose and contain the child's head and neck with freedom to move therein when the lower edges of the structure are positioned at about shoulder level, the side and front walls having openings therein simulating the side window and windshield panes of the simulated motor vehicle body and being so proportioned that said openings will be at substantially eye level when the lower edges of the structure are held at substantially shoulder level, and electric headlights positioned in the front wall of the structure.

4. A child's amusement device comprising a hollow box-like structure having a roof and side and end walls simulating the outward appearance of a motor vehicle body, said structure having a hollow interior large enough to enclose and contain the child's head and neck with freedom to move therein when the lower edges of the structure are positioned at about shoulder level, the front end wall and the two side walls having openings simulating the side window and windshield panes of the simulated motor vehicle body, a sound-producing horn mounted in the forward portion of the structure below the level of said openings, and actuating means therefor accessible to the child's hand when the structure is in head-enclosing position, the front end and side walls being so proportioned that said openings will be at about eye level when the structure is so positioned about the head that its lower edges are at substantially shoulder level.

5. A child's amusement device comprising a hollow box-like structure having a roof and side and end walls simulating the outward appearance of a motor vehicle body, said structure having a hollow interior large enough to enclose and contain the child's head and neck with freedom to move therein when the lower edges of the structure are positioned at about shoulder level, the front end wall and the two side walls having openings simulating the side window and windshield panes of the simulated motor vehicle body, a cross tie rod connecting the forward portions of the side walls to stiffen the structure and constitute means by which the structure may be held by the child's hand and steadied in head-enclosing position, a sound-producing horn mounted in the forward portion of the structure below the level of said openings and above the level of said rod, and actuating means for the horn accessible to the child's hand when the structure is in head-enclosing position, the front end and side walls being so proportioned that said openings will be at about eye level when the structure is so positioned about the head that its lower edges are at substantially shoulder level.

6. A child's amusement device comprising a hollow box-like structure having a roof and side and end walls simulating the outward appearance of a motor vehicle body, said structure having a hollow interior large enough to enclose and contain the child's head and neck with freedom to move therein when the lower edges of the structure are positioned at about shoulder level, the side and front walls having openings therein simulating the side window and windshield panes of the simulated motor vehicle body and being so proportioned that said openings will be at substantially eye level when the lower edges of the structure are held at substantially shoulder level, and a portion of the interior of the structure simulating the appearance of a motor vehicle instrument board and including representations of instrument board devices.

7. A blank formed of sheet material adapted to be folded to form a hollow box-like structure adapted to be supported in enclosing relation with the head and neck of a child, with freedom to move the head and neck therein, said blank comprising intermediate, front and two side portions connected by lines on which the blank when folded forms said portions respectively as the roof, front and sides of said box-like structure, said front and each of said side portions having openings through which the child may see when the structure is held in enclosing relation with his head, and said blank being ornamented to simulate the appearance of a vehicle body.

8. A blank formed of sheet material adapted to be folded to form a hollow box-like structure adapted to be supported in enclosing relation with the head and neck of a child with freedom to move his head and neck therein, said blank comprising intermediate, front and two side portions connected by lines on which the blank when folded forms said portions respectively as the roof, front and sides of said box-like structure, said front and each of said side portions having openings simulating respectively the windshield and the side window openings of a motor vehicle body through which the child may see when the structure is held in enclosing relation with his head, and said blank being ornamented to simulate the appearance of a motor vehicle body.

JANICE L. BALDWIN.